United States Patent
Malsam et al.

(10) Patent No.: US 7,604,681 B2
(45) Date of Patent: Oct. 20, 2009

(54) THREE-STAGE MEMBRANE GAS SEPARATION PROCESS

(75) Inventors: Michael G. Malsam, Sugar Land, TX (US); Kaaeid A. Lokhandwala, Fremont, CA (US)

(73) Assignees: Lummus Technology, Inc., Bloom Field, NJ (US); Membrane Technology and Research, Inc., Menlo Park, CA (US)

( * ) Notice: Subject to any disclaimer, the term of this patent is extended or adjusted under 35 U.S.C. 154(b) by 546 days.

(21) Appl. No.: 11/441,575

(22) Filed: May 26, 2006

(65) Prior Publication Data

US 2007/0272079 A1   Nov. 29, 2007

(51) Int. Cl.
*B01D 53/22*   (2006.01)
(52) U.S. Cl. .......... 95/45; 95/47; 95/51; 96/4; 96/7; 96/9; 96/10
(58) Field of Classification Search .......... 95/45, 95/47, 51; 96/4, 7, 9, 10, 13, 14
See application file for complete search history.

(56) References Cited

U.S. PATENT DOCUMENTS

| | | | |
|---|---|---|---|
| 2,159,434 A * | 5/1939 | Frey | 96/9 |
| 4,130,403 A | 12/1978 | Cooley et al. | |
| 4,264,338 A * | 4/1981 | Null | 95/47 |
| 4,435,191 A | 3/1984 | Graham | |
| 5,102,432 A * | 4/1992 | Prasad | 96/9 |
| 5,256,295 A * | 10/1993 | Baker et al. | 96/9 |
| 5,378,263 A * | 1/1995 | Prasad | 96/9 |
| 5,779,763 A * | 7/1998 | Pinnau et al. | 95/47 |
| 6,128,919 A | 10/2000 | Daus et al. | |
| 6,168,649 B1 * | 1/2001 | Jensvold et al. | 95/47 |
| 6,254,666 B1 * | 7/2001 | Li et al. | 95/47 |
| 6,565,626 B1 * | 5/2003 | Baker et al. | 95/47 |
| 6,572,678 B1 | 6/2003 | Wijmans et al. | |
| 6,572,679 B2 | 6/2003 | Baker et al. | |
| 6,630,011 B1 * | 10/2003 | Baker et al. | 95/47 |
| 6,648,944 B1 * | 11/2003 | Baker et al. | 96/9 |
| 2005/0217479 A1 * | 10/2005 | Hale et al. | 95/53 |

* cited by examiner

*Primary Examiner*—Jason M Greene
(74) *Attorney, Agent, or Firm*—J. Farrant

(57) ABSTRACT

A process for removing carbon dioxide or nitrogen from gas, especially natural gas. The process uses three membrane separation stages without compression between the second and third stages.

33 Claims, 1 Drawing Sheet ated with $C_{3+}$ hydrocarbons.
THREE-STAGE MEMBRANE GAS SEPARATION PROCESS

FIELD OF THE INVENTION

The invention relates to the use of gas separation membranes to remove excess carbon dioxide or nitrogen from gas, particularly natural gas.

BACKGROUND OF THE INVENTION

Natural gas is the most important fuel gas in the United States and provides more than one-fifth of all the primary energy used in the United States. Natural gas is also used extensively as a basic raw material in the petrochemical and other chemical process industries. The composition of natural gas varies widely from field to field. For example, a raw gas stream may contain as much as 95% methane, with only minor amounts of other hydrocarbons, nitrogen, carbon dioxide, hydrogen sulfide or water vapor. On the other hand, streams with large proportions of one or more of these contaminants are common. For example, gas that is extracted as a result of miscible flood enhanced oil recovery may be very rich in carbon dioxide, as well as being saturated with $C_{3+}$ hydrocarbons.

Overall, about 10% of gas exceeds the typical gas pipeline specification for carbon dioxide of no more than 2%. About the same percentage of gas is out of specification because of excess nitrogen.

Before such gas can be sent to the supply pipeline, the carbon dioxide content, nitrogen content or both must be reduced. Various techniques for acid gas removal, including absorption into an amine solution, cryogenic separation and membrane separation, have been used in the industry. For nitrogen removal, cryogenic separation has been used, and membrane separation is beginning to be introduced.

Membrane separation is attractive, because membrane systems are simple compared with amine or cryogenic technology. They have few moving parts, can operate under moderate temperature and pressure conditions, do not require a regeneration cycle, can be mounted on mobile skids, and are cost-effective for small production capacities.

Many patents describe the use of membrane separation to remove carbon dioxide from gas streams. U.S. Pat. No. 4,130,403 describes a method for removing hydrogen sulfide or carbon dioxide from natural gas using cellulose acetate membranes. These membranes remain in commercial use today.

U.S. Pat. No. 4,435,191 describes the use of multiple membrane units in series to remove carbon dioxide from a gas mixture. The residue from one unit is passed to the next stage for treatment. Compression steps raising the gas to progressively higher pressures are carried out between each stage.

U.S. Pat. No. 6,128,919 describes attempts to limit the power requirements of multistage membrane systems by operating at low power, and keeping the pressure to which gas streams are compressed below about 100 psig.

U.S. Pat. No. 6,648,944 describes a process for removing $C_{3+}$ hydrocarbons and carbon dioxide from natural gas, using a first membrane stage to remove the hydrocarbons and second and third stages to remove the carbon dioxide.

U.S. Pat. No. 6,565,626 describes processes for removing nitrogen from natural gas using nitrogen-selective membranes. Two-stage and three-stage process designs are shown.

U.S. Pat. Nos. 6,572,678 and 6,572,679 describe processes for removing nitrogen or carbon dioxide from gas mixtures using combinations of membranes that selectively permeate and selectively reject carbon dioxide and nitrogen compared with methane. Two-stage process designs are shown.

Despite the many advances that these patents represent, it is still difficult under field conditions to meet desired composition and recovery specifications. One problem is that carbon dioxide readily sorbs into and interacts strongly with many polymers, swelling or plasticizing the membrane, and thereby adversely changing the membrane permeation characteristics. Thus, even materials with high ideal selectivity for carbon dioxide over methane can provide a selectivity of only about 9 or 10 under real mixed gas, high-pressure conditions.

Such membranes can reduce the carbon dioxide content of the treated, residue gas stream to a target value of, for example, 2%, but, because the selectivity is modest, unacceptable quantities of methane will permeate with the carbon dioxide, and will be lost in the permeate stream.

Separation of nitrogen from methane by means of membranes also remains of limited utility because of very low selectivities. Whether methane-selective or nitrogen-selective membranes are used, selectivity is typically only about 2 or 3. As with carbon dioxide separation, unacceptable losses of methane into the permeate stream occur.

To overcome the low selectivity problems, multistage systems have been proposed in the literature, as shown in the patents cited above, and are in use to a limited extent. In an example of such a system, the permeate from the first membrane separation stage is passed as feed to a second stage, and the methane-rich residue is recycled to the first stage to reduce methane loss. To maintain adequate driving force for trans-membrane permeation in the second stage, and to facilitate residue recycle, the first-stage permeate must be recompressed, usually to the pressure of the raw feed gas.

The need for interstage compression greatly increases the capital cost of the membrane system. The introduction of the compression step also affects the operating costs, as the power requirements and maintenance costs are likely to be higher.

Further, the addition of a second membrane stage may not raise the methane recovery to the point that treatment of the raw gas becomes worthwhile.

For these reasons, much potentially valuable natural gas remains in the ground unexploited, awaiting better treatment technology.

SUMMARY OF THE INVENTION

The invention is a process for separating carbon dioxide or nitrogen from gas, especially natural gas, that also contains methane. The invention uses three membrane separation stages to produce a high-pressure, treated stream of low carbon dioxide or nitrogen content and a low-pressure, carbon-dioxide-rich or nitrogen-rich stream.

In a basic embodiment, as applied to carbon dioxide removal, the process of the invention includes the following steps for treating a gas stream:

(a) providing a first membrane having a first feed side and a first permeate side and being selective for carbon dioxide over methane;

(b) passing the gas stream as a first feed stream at a pressure of at least about 400 psia across the first feed side;

(c) withdrawing from the first feed side a first residue stream depleted in carbon dioxide compared with the gas stream;

(d) withdrawing from the first permeate side a first permeate stream enriched in carbon dioxide compared with the gas stream;

(e) compressing the first permeate stream;

(f) providing a second membrane having a second feed side and a second permeate side and being selective for carbon dioxide over methane;

(g) passing the compressed first permeate stream as a second feed stream across the second feed side;

(h) withdrawing from the second feed side a second residue stream depleted in carbon dioxide compared with the second feed stream;

(i) withdrawing from the second permeate side a second permeate stream enriched in carbon dioxide compared with the second feed stream;

(j) recirculating the second residue stream to step (b);

(k) providing a third membrane having a third feed side and a third permeate side and being selective for carbon dioxide over methane;

(l) passing the second permeate stream as a third feed stream without compression across the third feed side;

(m) withdrawing from the third feed side a third residue stream depleted in carbon dioxide compared with the third feed stream;

(n) withdrawing from the third permeate side a third permeate stream enriched in carbon dioxide compared with the third feed stream;

(o) recirculating the third residue stream to step (e).

The three stages are arranged so that the permeate stream from the first stage forms the feed to the second stage and the permeate stream from the second stage forms the feed to the third stage. The first permeate stream is compressed before it is passed as feed to the second stage; the second permeate stream is not compressed before it is passed as feed to the third stage.

Any gas stream that contains carbon dioxide and methane may be treated by the process of the invention. The process is particularly suited to treating gas streams from natural gas wells, landfills or the like. Methane is usually, but not necessarily, the major component of the gas, and the gas may frequently contain additional components, for example, nitrogen, hydrogen, water vapor or other hydrocarbons.

Although the process can treat gas streams with very high carbon dioxide concentrations, we believe it is most competitive for treating streams in which carbon dioxide is a minor component, such as less than 40% of the stream, and most preferably is present in a concentration below about 20%.

The residue stream from the first membrane separation step and the permeate stream from the third membrane separation step are withdrawn from the process. Either stream may be the principal product from the process. For example, the first residue stream may be pipeline quality gas, and the third permeate may be a waste stream. In some cases, both streams will be of value.

The membranes used in the three stages are selective in favor of carbon dioxide over methane. Representative membrane materials that can be used include polyimides, fluorinated dioxoles and dioxolanes, and cellulose acetate. The membranes used in each step may be the same or different. The most preferred membranes are those having a selective layer made from a polymer having a fluorinated cyclic structure.

It is preferred that the membranes of each stage provide a selectivity for carbon dioxide over methane of at least 5 under the operating conditions of the process. It is also preferred that the membranes provide a permeance for methane of at least about 5 gpu, more preferably at least about 10 gpu, and a permeance for carbon dioxide of at least 100 gpu under the process operating conditions.

Because the membranes used in each stage preferentially reject methane, the residue streams from all three stages are enriched in methane compared with the feed streams to the respective stages. To minimize methane loss, the residue streams from the second and third stages are usually recirculated within the process. The second residue stream can be returned and mixed with the first feed stream and the third residue stream can be returned and mixed with the first-stage permeate stream.

For each membrane stage, a driving force for transmembrane permeation is provided by the pressure difference between the feed and permeate sides of the membrane. To provide adequate driving force, it is preferred that the pressure of the feed stream to the first membrane stage be at least about 400 psia, and most preferably at least 500 psia. The pressure at which the first permeate stream is withdrawn should be set to provide a pressure ratio of at least about 5 across the first membrane.

The gas withdrawn as the first permeate stream is recompressed and then passed as feed to the second membrane stage. Most preferably, the gas should be recompressed to a pressure about the same as the first feed stream, most preferably again at least about 500 psia. The pressure ratio across the membrane in the second stage should also preferably be at least about 5.

The gas withdrawn as the second permeate stream is passed without compression as feed to the third membrane stage. That is, the pressure of the third feed stream is about the same as the pressure of the second permeate stream. The pressure ratio across the third membrane stage should preferably be at least 5, which means that the pressure of the second permeate/third feed stream should preferably be set no lower than about 50, 60 or 75 psia, and most preferably should be at least 100 psia.

The process may include additional optional steps, such as to treat the raw feed gas before the first membrane stage to remove contaminants or adjust pressure or temperature, to cool or warm gas between membrane stages, or to separate liquids that have condensed. Such steps are conventional and familiar to those of skill in the art.

In a basic embodiment, as applied to nitrogen removal, the process of the invention includes the following steps for treating a gas stream:

(a) providing a first membrane having a first feed side and a first permeate side and being selective for nitrogen over methane;

(b) passing the gas stream as a first feed stream at a pressure of at least about 400 psia across the first feed side;

(c) withdrawing from the first feed side a first residue stream depleted in nitrogen compared with the gas stream;

(d) withdrawing from the first permeate side a first permeate stream enriched in nitrogen compared with the gas stream;

(e) compressing the first permeate stream;

(f) providing a second membrane having a second feed side and a second permeate side and being selective for nitrogen over methane;

(g) passing the compressed first permeate stream as a second feed stream across the second feed side;

(h) withdrawing from the second feed side a second residue stream depleted in nitrogen compared with the second feed stream;

(i) withdrawing from the second permeate side a second permeate stream enriched in nitrogen compared with the second feed stream;

(j) recirculating the second residue stream to step (b);

(k) providing a third membrane having a third feed side and a third permeate side and being selective for nitrogen over methane;

(l) passing the second permeate stream as a third feed stream without compression across the third feed side;

(m) withdrawing from the third feed side a third residue stream depleted in nitrogen compared with the third feed stream;

(n) withdrawing from the third permeate side a third permeate stream enriched in nitrogen compared with the third feed stream;

(o) recirculating the third residue stream to step (e).

In the case of nitrogen removal, the arrangement of the membrane stages and the operation of the process steps is similar to that for carbon dioxide removal, and the preferences for operating conditions are the same except as noted otherwise explicitly. Most typically, the raw gas stream to be treated will contain up to about 15% nitrogen, and the goal will typically be to reduce the nitrogen content of the first residue stream to below 4% nitrogen.

Few membranes are known that are selective in favor of nitrogen over methane. The preferred membranes for nitrogen separation are those made from fluorinated dioxoles or dioxolanes or nitrogen-selective polyimides. The membrane selectivity will generally be lower than about 5, and commonly about 3. The pressure ratio in each membrane separation stage should preferably be at least about 3.

It has previously been believed in the art that a multistage membrane system for carbon dioxide or nitrogen separation from methane cannot provide adequate separation and methane recovery performance unless compression is used between each stage. Surprisingly, we have found that very good performance, with a methane product of acceptable purity and recovery, can be obtained by adding a third membrane stage and operating that stage without compression. The processes of the invention can generally achieve at least about 70% methane recovery, and may be designed to achieve 80% methane recovery, 90% methane recovery or more depending on membrane area used and available compression horsepower.

The ability of the third stage to improve methane recovery without necessitating the use of a second compressor is beneficial both in terms of the technical performance of the system and the economics of gas treatment. The process is operated with only one set of rotating equipment, thereby decreasing downtime for maintenance or repairs.

Other objects and advantages of the invention will be apparent from the description of the invention to those of ordinary skill in the art.

It is to be understood that the above summary and the following detailed description are intended to explain and illustrate the invention without restricting its scope.

DETAILED DESCRIPTION OF THE INVENTION

Figure 1:
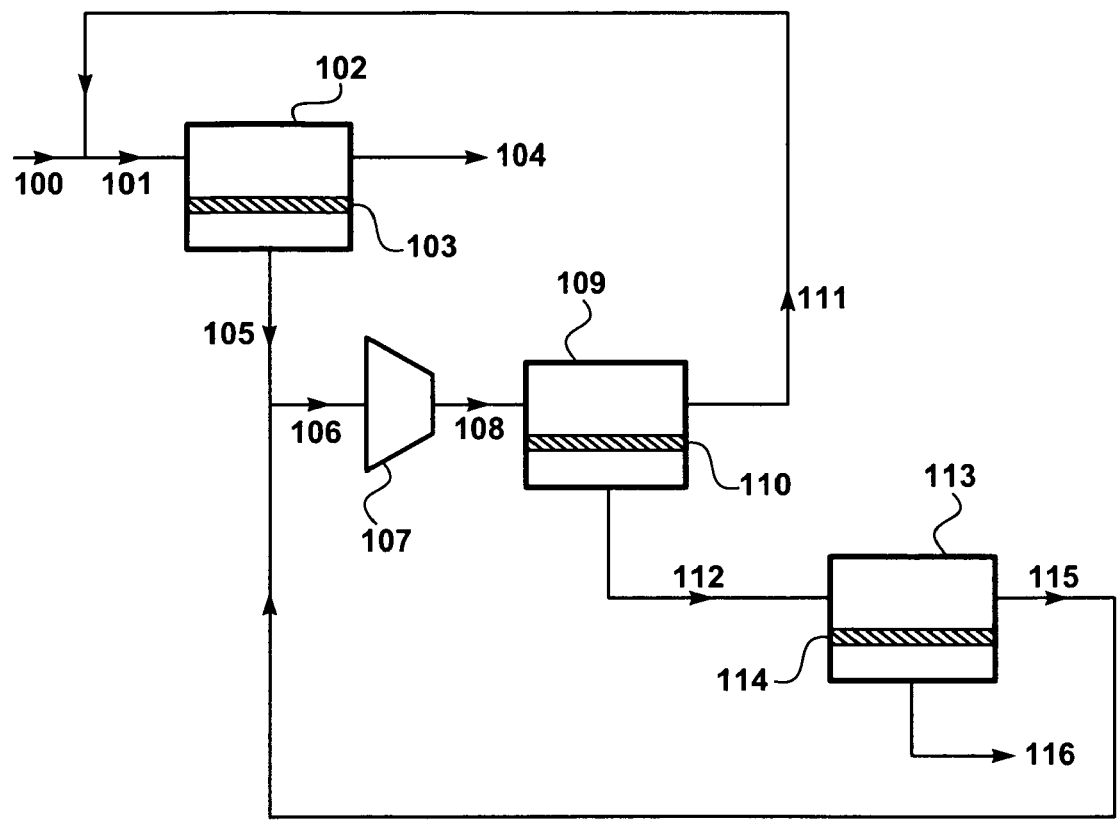
FIG. 1 is a schematic drawing showing a basic embodiment of the invention.

The term gas as used herein means a gas or a vapor.

The term $C_{2+}$ hydrocarbons mean hydrocarbons having at least two carbon atoms; the term $C_{3+}$ hydrocarbons means hydrocarbons having at least three carbon atoms.

The terms three-stage and multistage as used herein with regard to a membrane separation unit mean an arrangement of membrane modules or banks of membrane modules connected together such that the permeate stream from one module or bank of modules becomes the feedstream for the next.

The term pressure ratio means the ratio of total pressure of the feed gas to total pressure of the permeate gas for a membrane unit.

The permeance of a gas, also known as the pressure normalized flux, is expressed herein in gas permeation units (gpu), where $1 \text{ gpu} = 1 \times 10^{-6} \text{ cm}^3(\text{STP})/\text{cm}^2 \cdot \text{s} \cdot \text{cmHg}$.

All percentages herein are by volume unless otherwise stated.

The invention is a process for separating carbon dioxide or nitrogen from gas, especially natural gas, that also contains methane. For clarity, the invention is described below in the greatest detail as it relates to the separation of carbon dioxide from natural gas. Those of skill in the art will appreciate that the processes can also be carried out in the manner described to remove nitrogen instead of carbon dioxide from natural gas, or to remove nitrogen and carbon dioxide simultaneously, as well as to treat streams other than natural gas streams.

The invention uses three membrane separation stages to produce a high-pressure, treated stream of low carbon dioxide content and a low-pressure, carbon-dioxide-rich stream.

A basic representative process of the invention is shown in schematic form in FIG. 1. It will be appreciated by those of skill in the art that this is a very simple schematic flow diagram, intended to make clear the key aspects of the invention, and that an actual process train will usually include many additional components of a standard type, such as heaters, chillers, condensers, pumps, blowers, other types of separation and/or fractionation equipment, valves, switches, controllers, pressure-, temperature-level- and flow-measuring devices and the like.

Turning to this figure, raw gas stream, 100, may be any natural gas, or indeed any methane-containing gas, from which it is desired to remove carbon dioxide. The gas may be from a natural gas well, may be associated gas produced in conjunction with oil, either spontaneously or as a result of carbon dioxide injection, may be gas gathered from a landfill, or may arise from any other source.

If the gas is coming from a gas field, the process as shown may be carried out at individual wellheads, on pooled gas at intermediate stations, or at central gas-processing facilities, for example.

Stream 100 may be as-extracted from the ground or may have been subjected to pretreatment of any kind, including, but not limited to, filtration to remove particulates, entrained water or hydrocarbon liquids, separation by any means, including, but not limited to absorption, adsorption, condensation and other membrane or non-membrane separation, to remove gaseous contaminants, such as acid gases, $C_{3+}$ hydrocarbon vapors, nitrogen or water vapor, and compression to raise the gas to a sufficient pressure for operating the process.

Stream 100 contains at least methane and carbon dioxide. Methane is usually, but not necessarily, the major component. The content of carbon dioxide may be any amount, ranging from, for example, a few percent, such as about 4% or 5%, up to about 50%, 60%, 70% or more. Although the process can treat gas streams with very high carbon dioxide concentrations, the process design is particularly adapted to treat gas in which carbon dioxide is a minor component, such as less than about 40% or 30%, and most preferably is present in a concentration below about 20%.

Natural gas pipeline specification for carbon dioxide is often no more than about 2%. If the process is directed at treating carbon-dioxide-containing gas from a natural gas well, therefore, stream 100 will normally contain at least 2% carbon dioxide, and typically will contain at least about 4% carbon dioxide.

In addition to methane and carbon dioxide, various other components may be present in the gas stream. For a natural gas stream, typical additional components include water vapor, ethane, $C_{3+}$ hydrocarbons, hydrogen sulfide and inert gases such as nitrogen, helium and argon. Even if the gas has been pretreated as described above, at least small amounts of some of these components are likely to remain.

Raw gas stream 100 is typically at above atmospheric pressure. For efficient operation of the process, it is most preferred that stream 100 is at a pressure of at least about 500 psia. Very high feed pressures are not desirable, as they lead to high recompression costs or damage the membranes. In general, it is preferred that the pressure of stream 100 is below 1,500 psia, and more preferably is below 1,200 psia or most preferably 1,100 psia.

Stream 100 is combined with optional recirculation stream 111, described below, to form combined feed stream 101, which passes into first membrane separation step 102. This step is carried out using membranes, 103, that are selective in favor of carbon dioxide over methane and other hydrocarbons. It is preferred that the membranes provide a selectivity for carbon dioxide over methane of at least 5 under the operating conditions of the process. It is also preferred that the membranes provide a permeance for methane of at least about 5 gpu, more preferably at least about 10 gpu, and a permeance for carbon dioxide of at least 100 gpu, under the process operating conditions.

The membrane used is preferably able to deliver the required performance under the highest conditions of carbon dioxide partial pressure that are likely to occur in the process. Most preferably, the membranes should be able to provide selectivities for carbon dioxide over methane of 8, 9, 10 or more under real operating conditions, in conjunction with a carbon dioxide permeance of at least about 100 gpu.

Representative membrane materials that can be used for this step include cellulose acetate, other cellulose derivatives, polyimides, and fluorinated dioxoles and dioxolanes.

Despite their susceptibility to water, hydrogen sulfide and heavy hydrocarbons, cellulose acetate membranes are still the most widely used membranes in industrial carbon dioxide-separation units. They typically provide a carbon dioxide/methane selectivity of about 10 under real operating conditions. Such membranes are available commercially from Kvaerner Process Systems of Houston, Tex., or as Separex Membrane Systems from UOP of Des Plaines, Ill.

Alternative candidate membranes of this type include those made from different cellulose derivatives, such as ethylcellulose, methylcellulose, nitrocellulose, and particularly other cellulose esters.

Other preferred materials for membrane 103 are modern polyimides that exhibit resistance to plasticization or swelling when exposed to high partial pressures of carbon dioxide and $C_{3+}$ hydrocarbons, in conjunction with good carbon dioxide/methane selectivity and carbon dioxide permeability. As a non-limiting example, certain polyimides based on 6FDA may be used. For example, the polyimide 6FDA-MPDA has a carbon dioxide/methane selectivity of about 50 as measured in $C_{3+}$ hydrocarbon-free gas mixtures, and may provide a selectivity around 10 under real operating conditions.

Other specific polyimides with appropriate properties are taught in U.S. Pat. Nos. 4,880,442 (to E. I. Du Pont de Nemours) and 5,141,642 (to Ube Industries), both of which are incorporated herein by reference in their entirety.

Polyimide membranes are available commercially from Ube Industries, of Ube City, Japan, or from Medal LP, of Newport, Del., a division of Air Liquide.

The most preferred membranes 103 for use in step 102 are made from glassy polymers characterized by having repeating units of a fluorinated, non-aromatic cyclic structure, the ring having at least five members, and further characterized by a fractional free volume no greater than about 0.3. Preferred polymers in this group are formed from fluorinated monomers of (i) dioxoles, which are five-member rings of the form

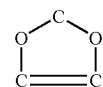

that polymerize by opening of the double bond, or (ii) dioxolanes, similar five-member rings but without the double bond in the main ring, or (iii) aliphatic structures having an alkyl ether group, polymerizable into cyclic ether repeat units with five or six members in the ring. The polymers may take the form of homopolymers or copolymers.

Such materials are discussed at length in U.S. Pat. Nos. 6,572,680 and 6,361,583, both of which are incorporated herein by reference in their entirety.

Specific preferred materials in this group are copolymers of tetrafluoroethylene with 2,2,4-trifluoro-5-trifluoromethoxy-1,3-dioxole having the structure:

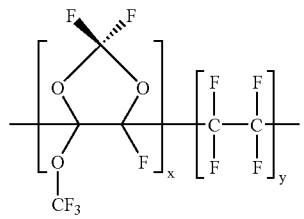

where x and y represent the relative proportions of the dioxole and the tetrafluoroethylene blocks, such that x+y=1.

Such materials are available commercially from Solvay Solexis, Inc. (Thorofare, N.J.) under the trade name Hyflon® AD. Different grades are available varying in proportions of the dioxole and tetrafluoroethylene units.

A second preferred material of this type has the structure:

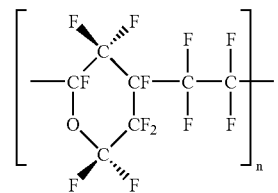

where n is a positive integer.

This material is available commercially from Asahi Glass Company, of Tokyo, Japan under the trade name Cytop®.

As yet another highly preferred alternative, membranes suitable for use in the invention are characterized by a fractional free volume no greater than about 0.3, a glass transition temperature, Tg, of at least about 100° C., and a fluorine: carbon ratio of at least 1:1, but need not necessarily include a cyclic structure. Such materials are discussed at length in U.S. Pat. Nos. 6,572,680 and 6,361,582, both of which are incorporated herein by reference in their entirety.

The membranes may take any convenient form. Preferably they are either integral asymmetric membranes, having a thin skin that is responsible for the separation properties and an underlying integral microporous support layer, or composite membranes, in which the selective layer and support can be made from different polymers. In either case, the polymer preferences discussed above refer to the selective layer.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules is the most preferred choice.

One or more membrane modules may be used in the stage, depending on the membrane area required. Typically, multiple membrane modules are used, and the modules are arranged in series in one or more pressure housings or tubes. Such arrangements are conventional and familiar to those of skill in the art.

A driving force for transmembrane permeation is provided by the pressure difference between the feed and permeate sides of the membrane. The permeant flux through the membranes is a function of the partial pressure difference across the membrane for that permeant.

The separation capability of the membrane is a function not only of the membrane selectivity, but also of the pressure ratio (total feed pressure:total permeate pressure) across the membrane. As a rough guideline, it is preferred that the pressure ratio be of the same order as the selectivity. Typically a pressure ratio in the range between about 3 and 20 is preferred, and between about 5 and 15 is most preferred.

The pressure on the permeate side should be maintained at a value with respect to the pressure on the feed side that provides the chosen pressure ratio. It is also convenient if the permeate pressure in the first membrane stage is about the same as the feed pressure in the third membrane stage, to facilitate recirculation within the process, as discussed in more detail below. In light of these considerations, it is preferred that the permeate pressure for membrane separation step 102 is maintained at above atmospheric pressure, more preferably at above about 50 psia, and most preferably in the range 60-200 psia.

The membrane separation step divides feed stream 101 into a first permeate stream, 105, enriched in carbon dioxide relative to feed stream 101, and a first residue stream, 104, enriched in methane relative to feed stream 101.

Residue stream 104 is usually the most carbon-dioxide-lean and methane-rich stream produced by the process, and is often, but not necessarily, the primary product of the process. For example, if the target is to meet pipeline specification for natural gas, it is most preferable that this stream contains no more than about 2% carbon dioxide. In other applications, higher or lower targets may be appropriate. For example, a carbon dioxide content of 3% or 4% may be acceptable for gas gathering lines.

As it is withdrawn from the feed side of the membrane, stream 104 is at about the same pressure as feed stream 101, subject only to slight pressure drops that can occur along the channels of the membrane modules. Stream 104 is withdrawn from the process and passed to any desired destination, for example a gas pipeline, a gas conversion or combustion process, or further processing.

First permeate stream 105, is withdrawn from the membranes of the first stage, is mixed with stream, 115, to form stream 106, and is passed to compression step, 107.

The compressor used in step 107 may be of any convenient type, such as centrifugal, screw or reciprocating, based on considerations of outlet pressure needed, gas flow rate and composition, and like issues familiar to those of skill in the art. Screw compressors are relatively inexpensive and are widely used to reach pressures up to about 300 or 400 psia; for higher pressures, piston compressors are more commonly used.

Typically, but not necessarily, the compression step raises the pressure of stream 106 between about 3-fold and 20-fold. Most preferably, the compression step raises the pressure of the gas stream 106 to about the same pressure as that of stream 100, to facilitate recirculation of gas within the process. The compression step may be done by single- or multi-stage compression, and may include after cooling and knock out of any condensed or entrained materials, all of which features of compression are commonplace and familiar to those of skill in the art.

Gas emerges from compression step 107 as compressed gas stream, 108, and is passed as a second feed stream to a second membrane separation stage, 109, containing membranes 110. The preferences for membranes 110 are similar to those for the membranes 103, and the preferences for the process operating conditions of stage 109 are similar to those of the first stage 102.

Membrane separation stage 109 divides the second feed stream into a second residue stream, 111, depleted in carbon dioxide compared with stream 108, and a second permeate stream, 112, enriched in carbon dioxide compared with stream 108.

Residue stream 111 remains at about the same pressure as stream 108, subject only to any slight pressure drops that may occur along the membrane modules. If stream 108 has been compressed to about the same pressure as stream 100, as is most preferred, stream 111 may be recirculated without recompression to the inlet of the first separation stage, as shown in FIG. 1.

Permeate stream 112 is withdrawn from the permeate side of the membranes. As with the first membrane separation stage, it is preferred to maintain the pressure of stream 112 above atmospheric pressure. In this case, however, the preferred pressure is at least about 75 psia, more preferably at least 100 psia, and most preferably at least about 120 psia, because permeate stream 112 is to be passed without recompression as feed to the third membrane stage.

Stream 112 enters third membrane separation stage, 113, containing membranes 114. The preferences for membranes 114 are similar to those for the membranes 110 and 103.

As with the other membrane separation stages, the third stage requires a transmembrane pressure difference adequate to provide driving force for permeation, and a pressure ratio adequate to achieve a useful separation performance.

The feed pressure in the third membrane stage is determined by the pressure of second stage permeate stream 112. However, this pressure must be set sufficiently low to provide adequate driving force and pressure ratio in the second stage. As a result, this pressure is usually below 250 psia, more typically is below 200 psia, and frequently below 150 psia.

The permeate pressure in the third stage should preferably be no lower than atmospheric pressure, and more preferably should be slightly above atmospheric pressure, such as up to about 50 psia, to facilitate transport of gas to its next destination. This pressure might be 15 psia, 20 psia or 30 psia, for example.

As a result of the relatively tight constraints on the feed and permeate pressure, both the pressure difference and the pressure ratio across the membranes, 114, of the third stage are generally more narrowly limited than is the case for the first and second stages.

For the reasons above, a pressure ratio in the third stage of above about 12 or 15 is hard to achieve, and, therefore, the pressure ratio in this stage is preferably in the range about 3-15, and frequently will be between about 3 and 10.

The pressure difference across the third membranes is usually considerably lower than the other stages. For example, in the first and second stages, a pressure difference of at least 300 psia is generally used, and a pressure difference of at least 400 psia is preferred. In the third stage, the pressure difference is generally no higher than about 200 psia, and may be only 150 psia, 120 psia or even less.

Transmembrane flux of a permeant is directly proportional to the partial pressure difference for that permeant across the membrane. Because the pressure difference across the membranes of the third stage is much lower than for the other two stages, it is particularly advantageous that the membranes used in the third membrane separation stage provide high permeant fluxes. For these membranes, a permeance for carbon dioxide of at least 100 gpu and for methane of at least 10 gpu is strongly preferred.

Membrane separation stage 113 divides stream 112 into a third residue stream, 115, depleted in carbon dioxide compared with stream 112, and a third permeate stream, 116, enriched in carbon dioxide compared with stream 112.

Residue stream 115 remains at about the same pressure as stream 112, subject only to any slight pressure drops that may occur along the membrane modules. Stream 115 may be recirculated as shown in FIG. 1 to the inlet to compression stage 107, thereby increasing methane recovery from the process. If compression stage 107 is carried out in multiple compression sub-stages, then stream 115 may be recirculated to any interstage position where the gas is at appropriate pressure.

Permeate stream 116 is withdrawn and from the process. This stream is the most carbon dioxide enriched stream in the process, and carbon dioxide may be the major component of the stream. This stream may be sent to any destination, including, but not limited to, further treatment for recovery of a carbon dioxide product, use as fuel, reinjection into the formation from which the raw gas was extracted, or to vent.

In general, a relatively high concentration of carbon dioxide in the third permeate stream is preferred, because this means the methane concentration is relatively low. In other words, most of the methane from the original feed gas has been captured in the process and recovered in the first residue stream. By a relatively high concentration, we mean it is preferred that the carbon dioxide concentration of this stream be at least three-fold higher than that of the raw feed stream, and more preferably at least four or five times higher. Expressed in terms of methane recovery, it is preferred to operate the process to recover at least 70% of the methane content of the raw feed stream, more preferably at least 80% and most preferably at least 90%.

The basic process design of FIG. 1 may also be used when the gas to be removed is nitrogen, and the description of the membranes and process parameters is the same for nitrogen removal as for carbon dioxide removal in most aspects.

In the case of nitrogen removal from natural gas, the goal will often be to reduce the nitrogen content of the first residue stream to no more than about 4% nitrogen, which is an acceptable total inerts value for pipeline gas. In other circumstances, a higher or lower nitrogen target value may be required.

The types of membranes available to perform a separation in which nitrogen is the preferentially permeating component and methane is the preferentially rejected component are very limited, because many membrane materials are essentially unselective with respect to this gas pair, or have a slight selectivity in favor of methane over nitrogen.

The preferred membranes for nitrogen separation are those made from fluorinated dioxoles or dioxolanes as described in detail above. Some polyimides may also be useable. The membrane selectivity will generally be lower than about 5, and commonly about 3. It is also preferred that the membranes, especially the membranes of the third stage, provide a permeance for nitrogen of at least 50 gpu under the process operating conditions.

Because the membrane selectivity tends to be lower for nitrogen over methane than for carbon dioxide over methane, a high pressure ratio is not normally required, and the pressure ratio for all three membrane stages in the nitrogen separation case is preferably at least 3, but preferably no more than about 10 or 12 for the upper limit. A higher pressure ratio may simply increase the needed compressor capacity and compression costs, without improving membrane separation performance.

The process design of FIG. 1 may also be used when the gas is out of specification because both carbon dioxide and nitrogen are present. By following the teachings above with respect to the membranes used and the process flow scheme, the invention may be used to bring such gas within the target content values for the contaminant gases.

The invention is now illustrated by the following examples, which are intended to further clarify understanding of the invention, but are not intended to limit the scope or underlying principles in any way.

EXAMPLES

Example 1

Nitrogen Removal, 8% Nitrogen Concentration

A computer calculation was performed with a modeling program, ChemCad V (ChemStations, Inc., Houston, Tex.), to demonstrate the process of the invention in a basic embodiment to separate nitrogen from methane, as in FIG. 1.

The calculation assumed that raw gas stream 100 has a flow rate of 1 MMscfd, contains 8% nitrogen, and is delivered to the process at 30° C. and 500 psia. The target for the process was to reduce the nitrogen content of the first residue stream to 4%.

It was assumed that each membrane stage contains a membrane having a fluorinated dioxole selective layer and providing a permeance for nitrogen of 50 gpu and a permeance for methane of 20 gpu, so that the nitrogen/methane selectivity is 2.5. The permeate pressures for the first and second membrane stages were assumed to be set at 150 psia, and the first permeate was assumed to be recompressed to 500 psia, so that the pressure ratio in the first and second stages was 3.3.

The third permeate was assumed to be withdrawn at atmospheric pressure, providing a pressure ratio of 10 in the third membrane stage.

The results of the calculations are summarized in Table 1.

TABLE 1

| | Stream | | | | | | | | |
|---|---|---|---|---|---|---|---|---|---|
| | 100 FEED | 101 | 104 TREATED RESIDUE | 105 | 108 | 111 | 112 | 115 | 116 TREATED PERMEATE |
| Temp (° C.) | 30 | 28 | 19 | 24 | 30 | 27 | 28 | 27 | 28 |
| Pressure (psia) | 500 | 500 | 500 | 150 | 500 | 500 | 150 | 150 | 15 |
| Flow rate (MMscfd) | 1.0 | 2.2 | 0.8 | 1.4 | 1.8 | 1.2 | 0.57 | 0.38 | 0.20 |
| Component (vol %): | | | | | | | | | |
| Methane | 92 | 92 | 96 | 89.8 | 89.8 | 92 | 85 | 89.8 | 76 |
| Nitrogen | 8.0 | 8.0 | 4.0 | 10.2 | 10.2 | 8.0 | 15 | 10.2 | 24 |

As can be seen, the process of the invention was able to meet the target of 4% nitrogen in the first residue stream, 104. Gas of this specification would be suitable for a natural gas pipeline. The third permeate stream, 116, contains 24% nitrogen. Gas of this composition could be used as fuel gas for a boiler or the like.

The methane recovery in this example is about 85%.

Example 2

Nitrogen Removal, 15% Nitrogen Concentration

The calculation of Example 1 was repeated, this time assuming that raw gas stream 100 contains 15% nitrogen at 30° C. and 500 psia. Other assumptions were the same as Example 1.

The results of the calculations are summarized in Table 2.

TABLE 2

| | Stream | | | | | | | | |
|---|---|---|---|---|---|---|---|---|---|
| | 100 FEED | 101 | 104 TREATED RESIDUE | 105 | 108 | 111 | 112 | 115 | 116 TREATED PERMEATE |
| Temp (° C.) | 30 | 29 | 15 | 21 | 119 | 29 | 29 | 28 | 28 |
| Pressure (psia) | 500 | 500 | 500 | 150 | 500 | 500 | 150 | 15 | 15 |
| Flow rate (MMscfd) | 1.0 | 5.1 | 0.7 | 4.4 | 5.0 | 4.1 | 0.82 | 0.49 | 0.33 |
| Component (vol %): | | | | | | | | | |
| Methane | 85 | 85 | 96 | 83 | 83 | 85 | 74 | 83 | 62 |
| Nitrogen | 15 | 15 | 4.0 | 17 | 17 | 15 | 25 | 17 | 38 |

As can be seen, the process of the invention was again able to meet the target of 4% nitrogen in the first residue stream, 104. The third permeate stream in this case contains 38% nitrogen, and the methane recovery is about 80%. A higher methane recovery would be possible under the same process operating conditions if the membrane selectivity were slightly higher.

Example 3

Carbon Dioxide Removal, Comparative Calculations

Three computer calculations were performed to model the treatment of a raw natural gas stream that is out of specification with respect to carbon dioxide. The calculations compare the performance of the process of the invention with a process using only two membrane separation stages and with a process using three stages, with compression between the stages.

In all cases, the raw gas entering the process was assumed to have the following composition:

| | |
|---|---|
| Methane: | 90.1% |
| Carbon dioxide: | 5.1% |
| Balance | 4.8% |
| ($C_{2+}$ hydrocarbons//nitrogen/water vapor): | | and to be at a pressure of just under 1,000 psia. The calculations were carried out assuming that the same amount of membrane area was available for each separation stage in each calculation. In all cases, the goal was to reduce the carbon dioxide content of the gas to 2%. For the first calculation, according to the process of the invention, the raw gas flow rate was assumed to be about 6 MMscfd.

All membrane separation stages were assumed to contain membranes having fluorinated dioxole or dioxolane selective layers.

(a) Process in Accordance with the Invention

The permeate pressure for the first membrane separation stage was assumed to be 62 psia and for the second stage 105 psia. The first permeate was assumed to be recompressed to the same pressure as the raw gas, 990 psia. The third permeate was assumed to be withdrawn at 20 psia.

The results of the calculations are summarized in Table 3.

TABLE 3

| | Stream | | | | | | | | |
|---|---|---|---|---|---|---|---|---|---|
| | 100 FEED | 101 | 104 PIPELINE GAS | 105 | 108 | 111 | 112 | 115 | 116 VENT GAS |
| Temp (° C.) | 48 | 46 | 40 | 43 | 48 | 31 | 40 | 38 | 38 |
| Pressure (psia) | 990 | 980 | 960 | 62 | 990 | 980 | 105 | 95 | 20 |
| Flow (MMscfd) | 5.9 | 7.0 | 5.7 | 1.3 | 1.8 | 1.1 | 0.78 | 0.57 | 0.21 |
| | | | Component (vol %): | | | | | | |
| Methane | 90.1 | 91.0 | 93.1 | 79.2 | 74.0 | 93.0 | 48.3 | 62.5 | 10.4 |
| Carbon dioxide | 5.1 | 5.2 | 2.0 | 19.5 | 25.1 | 5.6 | 51.3 | 37.0 | 89.4 |
| Balance ($C_{2+}$ etc.) | 4.8 | 3.8 | 4.9 | 4.9 | 0.9 | 1.4 | 0.4 | 0.5 | 0.2 |

Membrane area: Stage 102: 480 m²
Stage 109: 192 m²
Stage 113: 360 m²
Compressor hp: 350 hp As can be seen, the process of the invention provides a first residue stream in which the carbon dioxide content has been reduced to 2%, meeting pipeline specification. The third permeate stream, in which the carbon dioxide content has been raised to almost 90%, could be vented or used for carbon dioxide recovery. The vent stream, 116, is of low volume flow, about 0.2 MMscfd, and has a low methane concentration of about 10%, representing a methane loss of less than half a percent in the process.

(b) Two-Stage-Only Process

The calculations were repeated, in this case assuming that the gas treatment was carried out using only the first two membrane separation stages, 102 and 109. In other words, permeate stream 112 was assumed to be withdrawn as vent gas from the process without passing to the third stage, so that there is no recirculation stream 115. Feed pressures for the two membrane separation stages were assumed to be as in case (a), and vent stream 112 was assumed to be withdrawn at a pressure of 25 psia. The results of the calculation are summarized in Table 4.

As can be seen, the process can again provide a first residue stream in which the carbon dioxide content has been reduced to 2%. Without recycle from a third stage, the membrane area in the first two stages was able to process 7 MMscfd, compared with 6 MMscfd for the process of the invention. Without the recycle, the compressor capacity to process this volume of raw gas was only 240 hp, compared with 350 hp for the process of the invention.

The vent stream, 112 in this case, has a flow rate of nearly 0.7 MMscfd and a methane content of about 65%. For this design, therefore, the methane loss is almost 7%, compared with less than 0.5% for the process of the invention. Thus, the process of the invention can cut methane loss by more than an order of magnitude, yet still use only one piece of rotating equipment.

(c) Three-Stage Process with Compression Between each Stage

The calculations were repeated, in this case assuming that the gas treatment was carried out using three membrane separation stages, but including an additional compression step in line 112 to recompress stream 112 from 25 psia as withdrawn

TABLE 4

| | Stream | | | | | | |
|---|---|---|---|---|---|---|---|
| | 100 FEED | 101 | 104 PIPELINE GAS | 105 | 108 | 111 | 112 VENT GAS |
| Temp (° C.) | 48 | 47 | 42 | 44 | 48 | 26 | 38 |
| Pressure (psia) | 990 | 980 | 960 | 62 | 990 | 980 | 25 |
| Flow (MMscfd) | 7.0 | 7.6 | 6.3 | 1.3 | 1.3 | 0.61 | 0.68 |
| | | | Component (vol %): | | | | |
| Methane | 90.1 | 90.7 | 93.0 | 80.1 | 80.1 | 97.5 | 64.5 |
| Carbon dioxide | 5.1 | 4.8 | 2.0 | 18.6 | 18.6 | 0.4 | 35.0 |
| Balance ($C_{2+}$ etc.) | 4.8 | 4.5 | 5.0 | 1.3 | 1.3 | 2.1 | 0.5 |

Membrane area: Stage 102: 480 m²
Stage 109: 192 m²
Compressor hp: 241 hp from stage 109 to 110 psia as entering stage 113. The results of the calculation are summarized in Table 5.

nitrogen. The raw gas was assumed to be delivered to the process at 38° C. and 990 psia.

TABLE 5

|  | Stream | | | | | | | | |
|---|---|---|---|---|---|---|---|---|---|
|  | 100 FEED | 101 | 104 PIPELINE GAS | 105 | 108 | 111 | 112 | 115 | 116 VENT GAS |
| Temp (° C.) | 48 | 46 | 41 | 43 | 48 | 28 | 46 | 44 | 45 |
| Pressure (psia) | 990 | 980 | 960 | 62 | 990 | 980 | 110 | 100 | 20 |
| Flow (MMscfd) | 6.6 | 7.6 | 6.4 | 1.3 | 1.9 | 1.0 | 0.86 | 0.63 | 0.24 |
|  |  |  | Component (vol %): | | | | | | |
| Methane | 90.1 | 91.0 | 93.1 | 80.2 | 74.0 | 96.3 | 47.4 | 61.5 | 9.8 |
| Carbon dioxide | 5.1 | 4.8 | 2.0 | 18.6 | 25.0 | 2.3 | 52.2 | 38.0 | 90.1 |
| Balance ($C_{2+}$ etc.) | 4.8 | 4.2 | 4.9 | 1.2 | 1.0 | 1.4 | 0.4 | 0.5 | 0.1 |

Membrane area: Stage 102: 480 $m^2$
Stage 109: 192 $m^2$
Stage 113: 360 $m^2$
Compressor hp: 360 hp + 96 hp for additional compressor = 456 hp As can be seen, the process can again provide a first residue stream in which the carbon dioxide content has been reduced to 2%. With the addition of a second compressor system in line 112, the three stage arrangement is able to process 6.6 MMscfd, compared with 6 MMscfd for the process of the invention.

The vent stream has a flow rate of 0.24 MMscfd and a methane content of just under 10%. For this design, therefore, the methane loss is very low, at about 0.4%. Compared with the process of the invention, however, the compression requirements increase from 350 hp to 450 hp. More significantly, a second piece of rotating equipment is needed.

Example 4

Separation of Carbon Dioxide and Nitrogen from Methane

A computer calculation was performed to demonstrate the process of the invention in an embodiment where both carbon dioxide and nitrogen are present in the feed stream at values above specification.

Referring to FIG. 1, the calculation assumed that raw gas stream 100 has a flow rate of about 6 MMscfd, and contains about 10% total inerts, about 5% each of carbon dioxide and nitrogen.

It was assumed that each membrane stage contains a membrane having a fluorinated dioxole selective layer, and that the target was to reduce the total inerts content to below 4% and the nitrogen content to no more than 2%.

The results of the calculations are summarized in Table 6.

TABLE 6

|  | Stream | | | | | | | | |
|---|---|---|---|---|---|---|---|---|---|
|  | 100 FEED | 101 | 104 PIPELINE GAS | 105 | 108 | 111 | 112 | 115 | 116 VENT GAS |
| Temp ° C. | 38 | 44 | 28 | 37 | 49 | 27 | 44 | 42 | 43 |
| Pressure (psia) | 990 | 980 | 960 | 62 | 990 | 980 | 80 | 70 | 20 |
| Flow (MMscfd) | 6.4 | 11 | 4.9 | 6.0 | 7.2 | 4.6 | 2.6 | 1.1 | 1.5 |
|  |  |  | Component (vol %): | | | | | | |
| Methane | 85 | 88 | 92 | 85 | 86 | 92 | 74 | 89 | 62 |
| Carbon dioxide | 5.3 | 3.4 | 0.1 | 6.1 | 5.5 | 0.8 | 13.8 | 2.5 | 22 |
| Nitrogen | 5.0 | 5.1 | 2.0 | 7.6 | 7.6 | 5.1 | 12 | 7.9 | 15 |
| $C_{2+}$ hydrocarbons | 4.7 | 3.5 | 5.9 | 1.3 | 0.9 | 2.1 | 0.2 | 0.6 | 1.0 |

As can be seen, the process of the invention provides a first residue stream in which the nitrogen content has been reduced to 2%, and the total inerts content to below 4%. The very low carbon dioxide concentration in the residue stream arises because the process provides much higher selectivity for carbon dioxide over methane than for nitrogen over methane.

The third permeate stream has a methane content of 62%, and could be used as fuel. The methane recovery is about 85%.

We claim:

1. A process for separating carbon dioxide from methane in a gas stream comprising the steps of:
   (a) providing a first membrane having a first feed side and a first permeate side and being selective for carbon dioxide over methane;
   (b) passing the gas stream as a first feed stream at a first pressure of at least about 400 psia across the first feed side;

(c) withdrawing from the first feed side a first residue stream depleted in carbon dioxide compared with the gas stream;
(d) withdrawing from the first permeate side a first permeate stream enriched in carbon dioxide compared with the gas stream;
(e) compressing the first permeate stream;
(f) providing a second membrane having a second feed side and a second permeate side and being selective for carbon dioxide over methane;
(g) passing the compressed first permeate stream as a second feed stream across the second feed side;
(h) withdrawing from the second feed side a second residue stream depleted in carbon dioxide compared with the second feed stream;
(i) withdrawing from the second permeate side a second permeate stream enriched in carbon dioxide compared with the second feed stream;
(j) recirculating the second residue stream to step (b);
(k) providing a third membrane having a third feed side and a third permeate side and being selective for carbon dioxide over methane;
(l) passing the second permeate stream as a third feed stream without compression across the third feed side;
(m) withdrawing from the third feed side a third residue stream depleted in carbon dioxide compared with the third feed stream;
(n) withdrawing from the third permeate side a third permeate stream enriched in carbon dioxide compared with the third feed stream;
(o) recirculating the third residue stream to step (e).

2. The process of claim 1, wherein the gas stream comprises natural gas.

3. The process of claim 1, wherein the gas stream contains at least about 4% carbon dioxide.

4. The process of claim 1, wherein the first pressure is greater than about 500 psia and less than about 1,200 psia.

5. The process of claim 1, wherein the gas stream contains less than 20% carbon dioxide.

6. The process of claim 1, wherein the first permeate stream is withdrawn from the first permeate side at a second pressure of at least 20 psia and compressed in step (e) to at least about 400 psia.

7. The process of claim 1, wherein the first residue stream contains less than 4% carbon dioxide.

8. The process of claim 1, wherein the third permeate stream contains between 70% and 95% carbon dioxide.

9. The process of claim 1, wherein the second permeate stream is withdrawn from the second permeate side and passed across the third feed side at a third pressure of at least about 60 psia.

10. The process of claim one wherein the first, second and third membranes have a selectivity for carbon dioxide over methane in the range 5-30.

11. The process of claim 1, wherein the first, second and third membranes have a methane permeance of at least about 5 gpu.

12. The process of claim 1, wherein the first, second and third membranes each have a selective layer comprising the same polymer.

13. The process of claim 1, wherein the first membrane comprises a polymer having a repeat unit comprising a fluorinated cyclic structure.

14. The process of claim 1, wherein at least about 90% of the methane contained in the gas stream is recovered in the first residue stream.

15. The process of claim 1, wherein the gas stream further comprises nitrogen.

16. The process of claim 1, where the gas stream further contains an aggregate percentage of carbon dioxide and nitrogen that is at least 4%.

17. A process for separating nitrogen from methane in a gas stream comprising the steps of:
(a) providing a first membrane having a first feed side and a first permeate side and being selective for nitrogen over methane;
(b) passing the gas stream as a first feed stream at a first pressure of at least about 400 psia across the first feed side;
(c) withdrawing from the first feed side a first residue stream depleted in nitrogen compared with the gas stream;
(d) withdrawing from the first permeate side a first permeate stream enriched in nitrogen compared with the gas stream;
(e) compressing the first permeate stream;
(f) providing a second membrane having a second feed side and a second permeate side and being selective for nitrogen over methane;
(g) passing the compressed first permeate stream as a second feed stream across the second feed side;
(h) withdrawing from the second feed side a second residue stream depleted in nitrogen compared with the second feed stream;
(i) withdrawing from the second permeate side a second permeate stream enriched in nitrogen compared with the second feed stream;
(j) recirculating the second residue stream to step (b);
(k) providing a third membrane having a third feed side and a third permeate side and being selective for nitrogen over methane;
(l) passing the second permeate stream as a third feed stream without compression across the third feed side;
(m) withdrawing from the third feed side a third residue stream depleted in nitrogen compared with the third feed stream;
(n) withdrawing from the third permeate side a third permeate stream enriched in nitrogen compared with the third feed stream;
(o) recirculating the third residue stream to step (e).

18. The process of claim 17, wherein the gas stream comprises natural gas.

19. The process of claim 17, wherein the gas stream contains at least about 4% nitrogen.

20. The process of claim 17, wherein the first pressure is greater than about 500 psia and less than about 1,200 psia.

21. The process of claim 17, wherein the gas stream contains less than 20% nitrogen.

22. The process of claim 17, wherein the first permeate stream is withdrawn from the first permeate side at a second pressure of at least 20 psia and compressed in step (e) to at least about 400 psia.

23. The process of claim 17, wherein the first residue contains no more than about 4% nitrogen.

24. The process of claim 17, wherein the second permeate stream is withdrawn from the second permeate side and passed across the third feed side at a third pressure of at least about 50 psia.

25. The process of claim 17, wherein the first, second and third membranes have a nitrogen permeance of at least about 50 gpu.

26. The process of claim 17, wherein the first, second and third membranes each have a selective layer comprising the same polymer.

27. The process of claim 17, wherein the first membrane comprises a polymer having a repeat unit comprising a fluorinated cyclic structure.

28. The process of claim 17, wherein at least about 75% of the methane contained in the gas stream is recovered in the first residue stream.

29. The process of claim 1, further comprising maintaining a fourth pressure on the third permeate side that is no lower than atmospheric pressure.

30. The process of claim 1, wherein a second membrane pressure ratio is maintained across the second membrane, a third membrane pressure ratio is maintained across the third membrane and the third membrane pressure ratio is lower than the second membrane pressure ratio.

31. The process of claim 29, wherein:

a second membrane pressure ratio of between 3 and 20 is maintained across the second membrane, a third membrane pressure ratio between 3 and 15 is maintained across the third membrane and the second and third membrane pressure ratios are maintained by selecting a second permeate pressure to be maintained on the second permeate side without compression between the second permeate side and the third feed side.

32. The process of claim 17, further comprising maintaining a fourth pressure on the third permeate side that is no lower than atmospheric pressure.

33. The process of claim 32, wherein:

a second membrane pressure ratio of between 3 and 12 is maintained across the second membrane, a third membrane pressure ratio between 3 and 12 is maintained across the third membrane and the second and third membrane pressure ratios are maintained by selecting a second permeate pressure to be maintained on the second permeate side without compression between the second permeate side and the third feed side.

* * * * *